F. KILIAN.
CLUTCH OPERATING MECHANISM.
APPLICATION FILED MAY 10, 1910.
983,624.
Patented Feb. 7, 1911.
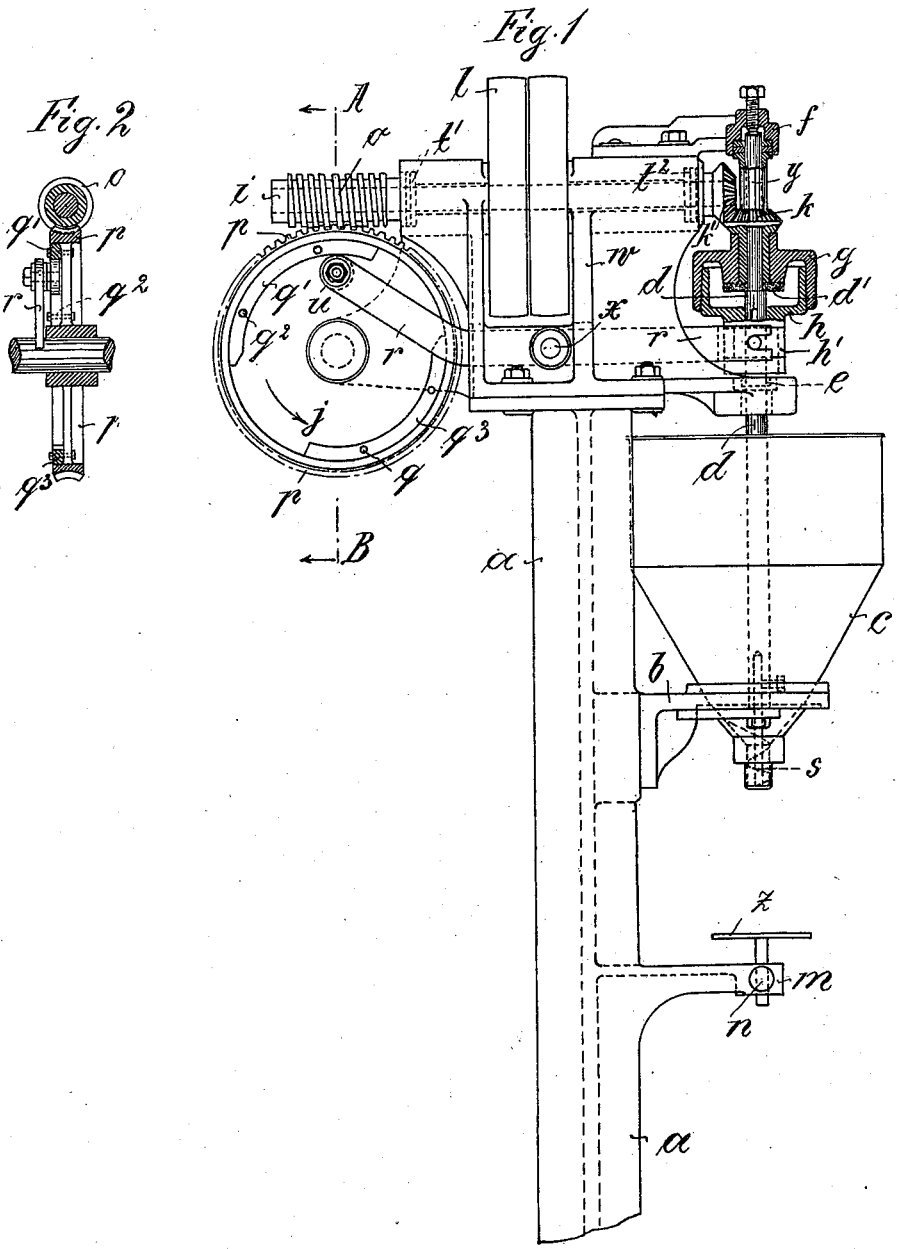

UNITED STATES PATENT OFFICE.

FRITZ KILIAN, OF LICHTENBERG, NEAR BERLIN, GERMANY.

CLUTCH-OPERATING MECHANISM.

983,624.

Specification of Letters Patent. Patented Feb. 7, 1911.

Application filed May 10, 1910. Serial No. 560,511.

*To all whom it may concern:*

Be it known that I, FRITZ KILIAN, a subject of the King of Prussia, and resident of 102–104 Herzbergstrasse, of Lichtenberg, near Berlin, Kingdom of Prussia, Germany, have invented certain new and useful Improvements in Clutch-Operating Mechanism, of which the following is a specification.

This invention relates to improvements in clutch operating mechanism particularly adapted for apparatus for delivering predetermined quantities of granular pulverulent and like materials of the kind in which the material is delivered from a hopper device by a rotating worm. In apparatus of this kind as hitherto constructed it has been found that the movement of the worm was not arrested with the necessary promptitude so that the material was not always delivered in the desired quantity.

The principal object of this invention is to avoid this disadvantage. A further object is to provide a simple construction of movement for apparatus of the type referred to and one in which the period of rotation of the worm can be readily altered when desired without altering the speed of rotation or pitch of the worm. For these ends the worm shaft is driven through the medium of a coupling which is thrown into and out of gear by the operation of a continuously rotating cam.

The invention is illustrated in the accompanying drawing, in which:

Figure 1 is a broken elevation partly in section of the invention applied to apparatus for delivering predetermined quantities of granular and like material, Fig. 2 being a transverse section on the line A—B of Fig. 1.

Referring to the drawings a hopper $c$ is supported upon a bracket $b$ on the main frame $a$; the shaft $d$ of the delivery worm $s$ is supported in antifriction bearings $e$ and $f$. One half $g$ of a friction coupling is freely mounted on the shaft $d$ and is driven by a miter-wheel $k$. The weight of the miter-wheel $k$ and the part $g$ of the coupling is supported by a collar $d'$ on the shaft $d$.

Between the upper bearing $f$ and the miter-wheel $k$ is provided a sleeve $y$ bearing against friction rings in the bearing $f$ and acting as a distance piece. The other half $h$ of the coupling is connected to the shaft $d$ by a spline so as to provide a vertical movement of the part $h$ on the shaft $d$. A trunnion ring $h'$ is provided on an annular extension of the part $h$ of the coupling, which is operated by the forked end of a double armed lever $r$ pivoted at $x$ to the frame $a$. The free end of the lever $r$ is provided with an antifriction roller $u$ which is adapted to engage with a cam $q'$ connected by screws $q^2$ to a worm wheel $p$ mounted in bearings on the frame $a$. The worm wheel $p$ is driven in the direction of the arrow $j$ by a worm $o$ mounted on one end of a shaft $i$ journaled in horizontal bearings in a bracket $w$ secured on the top of the frame $a$. On the other end of the shaft $i$ is keyed a miter wheel $k'$ engaging the miter-wheel $k$. The horizontal thrusts on the shaft $i$ are taken up by antifriction rings $t'$ $t^2$. On the shaft $i$ are also mounted fast and loose pulleys $l$.

The required number of revolutions of the worm shaft $d$ and shaft $i$ having been determined, it will be understood that the worm, worm wheel and circumferential length of the cam are so proportioned as to at once throw the coupling $g$ $h$ out of gear when the shaft $i$ has made the predetermined number of revolutions. As shown a second cam $q^3$ is secured to the worm wheel $p$ by bolts $q^2$. An interval of space is provided for lost motion between the ends of the cams permitting a period of time to elapse for the removal of the filled receptacle and the placing of another empty receptacle without throwing the driving strap over the loose pulley. It is obvious however that the number of cams depends upon the quantity of material to be delivered, the pitch of the worm and the diameters of the cam worm and worm wheel. A table $z$ is provided for a receptacle to receive the measured quantity of the material.

To adjust the height of the table $z$ the table as shown is formed with a depending support sliding in a bracket on the frame $a$ and secured by an adjusting screw $n$.

In the drawings the roller $u$ is shown engaged by the cam $q'$ so that the coupling is in gear. Assuming that the machine has been stopped in the position in which the coupling is thrown out of gear, a receptacle to be filled is placed on the table $z$ and the driving strap thrown off the loose pulley over the fast pulley $l$. The shaft $i$, worm $o$, worm wheel $p$, miter wheels $k$ $k'$ and the upper half $y$ of the coupling then continue to rotate until one of the cams $q'$ or $q^3$ comes into contact with the roller $u$ on the lever $a$, causing the latter to rotate about the pivot $x$ thus bringing the stationary half $h$ of the coupling into gear with the rotating half $g$, and causing the shaft $d$ and worm $s$ to rotate. When the worm $s$ has performed the required number of revolutions, the roller $u$ is released by the cam $q'$ or $q^3$ and the lever $r$ is rotated about the pivot $x$ by the preponderating weight of the half $h$ of the coupling, so that the coupling is thrown out of gear. The worm $s$ is thereby stopped and remains stopped until the following cam $q'$ or $q^3$ engages with the roller $u$ thus allowing time for the filled receptacle to be removed and replaced by another receptacle to be filled.

The quantity of material to be delivered may be easily varied without altering the pitch of the worm $s$ by removing the cams $q'$ and $q^3$ and replacing them by other cams which hold the coupling in gear during a greater or less angular movement of the worm wheel shaft. The construction permits of a further variation being made by varying the proportions of the worm and worm wheel.

It will be observed that the apparatus is so constructed that the hopper and retainer $c$ and table $z$ are readily accessible thus facilitating the rapid filling and operation. It will also be understood that the shaft $i$ may be driven in any convenient manner.

I claim:—

1. A device for operating the clutch on a shaft so as to intermittingly operate said shaft, a driving shaft in connection with another shaft; a clutch comprising a coupling between said driving shaft and the other shaft, a cam shaft, a driving worm on the driving shaft, a worm wheel on said cam shaft driven by the driving worm, a cam operated by the cam shaft and adapted to engage and disengage the coupling, said driving worm and worm wheel being so proportioned as to rotate said cam shaft at such a speed that the coupling is held in engagement during a predetermined number of revolutions of the other or working shaft.

2. A device for operating the clutch on a shaft so as to intermittingly operate said shaft, a driving shaft in connection with another shaft; a clutch comprising a coupling between said driving shaft and said other shaft, a cam shaft, a series of cams operated by said cam shaft, each cam being adapted to engage and disengage the coupling, said cams being relatively so located that the coupling is disengaged during a predetermined period of time, and means operated by the driving shaft for rotating the cam shaft at such a speed that the coupling is held in engagement during a predetermined number of revolutions of the other or working shaft.

3. A device for operating the clutch on a shaft so as to intermittingly operate said shaft, a driving shaft in connection with another shaft; a clutch comprising a coupling between said driving shaft and said other shaft, a cam shaft, a driving worm on said shaft, a worm wheel on said cam shaft driven by said driving worm, a pivoted double armed lever whose one end is adapted to engage and disengage the coupling, a series of cams detachably secured to said worm wheel, each cam being adapted to engage and disengage with the second end of said lever, said cams being relatively so located that the coupling is disengaged during a predetermined period of time and said worm gearing being so proportioned that the coupling is held in engagement by each of said cams during a predetermined number of revolutions of the other or working shaft.

In witness whereof I have hereunto set my hand in the presence of two witnesses.

FRITZ KILIAN.

Witnesses:
HENRY HASPER,
ARTHUR SCHROEDER.